Figure 1:
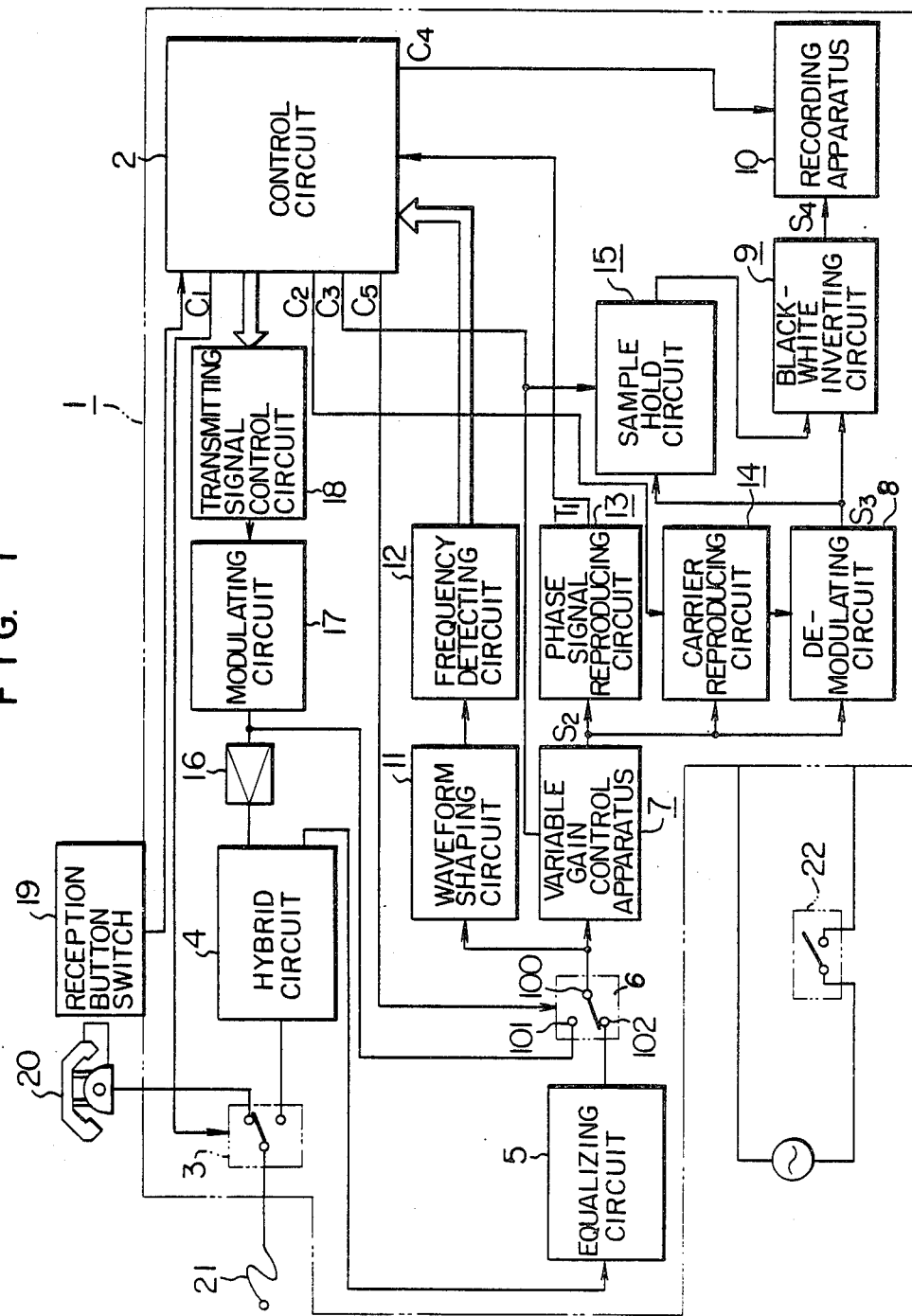

United States Patent [19]

Maeno

[11] 4,346,410
[45] Aug. 24, 1982

[54] FACSIMILE RECEIVER

[75] Inventor: Tetsuo Maeno, Ueda, Japan

[73] Assignee: Matsushita Graphic Communications Systems, Inc., Tokyo, Japan

[21] Appl. No.: 138,898

[22] Filed: Apr. 10, 1980

[30] Foreign Application Priority Data

Apr. 17, 1979 [JP] Japan .................................. 54-47630
May 8, 1979 [JP] Japan .................................. 54-55981

[51] Int. Cl.³ .............................................. H04N 1/32
[52] U.S. Cl. .................................. 358/281; 358/257; 358/264
[58] Field of Search ........................ 358/281, 257, 264

[56] References Cited

U.S. PATENT DOCUMENTS 3,441,665 4/1969 Wuensch .............................. 358/257
4,146,908 3/1979 Vandling .............................. 358/264
4,238,775 12/1980 Vandling .............................. 358/257

Primary Examiner—Howard Britton
Attorney, Agent, or Firm—Stevens, Davis, Miller & Mosher

[57] ABSTRACT

A facsimile receiver, wherein the carrier, which is necessary to reproduce the carrier in the case where the received signal is demodulated through synchronous detection, is reproduced exactly in the carrier reproducing means in the facsimile receiver before the arrival of the picture signal at the facsimile receiver, by supplying also to the demodulating means the communication control signal to be sent from the facsimile receiver to the transmitting station before the transmission of the picture signal from the transmitting station. Moreover, by operating the PLL circuit in the carrier reproducing means in response to all the carrier components in the picture signal, a very quick compensation can be made for phase jitter generated in the telephone circuit so that an exact carrier can be maintained, and the distortion of the reproduced picture can be minimized.

2 Claims, 8 Drawing Figures

FACSIMILE RECEIVER

This invention relates to a facsimile receiver in which demodulation is effected through synchronous detection. In this kind of a facsimile receiver, the demodulating means must reproduce the carrier signal exactly. In the conventional facsimile receiver, however, it was often difficult to exactly reproduce the carrier signal since the picture signal sometimes contained some carrier dropouts or since the carrier frequency was contaminated by the picture frequency during the dropouts. Moreover, in a facsimile receiver provided with a mechanism for compensating for such carrier dropouts, another problem remained to be solved in that the swift and exact reproduction of the carrier signal (hereinafter referred to simply as carrier) before the arrival of picture signal was difficult. Also, the facsimile receiver with such a dropout compensating mechanism had a drawback in that its slow response to phase jitter occurring in the picture signal resulted in disturbances to reproduced pictures.

According to this invention, the communication control signal which is to be sent from receiver to sending station before the reception of picture signal by the receiver, is delivered to the circuit and also received by the demodulating means in the receiver so as to actuate the PLL circuit of the carrier reproducing mechanism in the demodulating means in response to the communication control signal, whereby the carrier may be reproduced exactly before the arrival of picture signal.

Further, according to this invention, the above mentioned carrier reproducing mechanism is comprised of a means for extracting the carrier component from the input signal; a means for shaping the waveform of the extracted carrier component; a voltage-controlled oscillating means; a means for performing a phase comparison by implementing an Exclusive OR function of the output of the voltage-controlled oscillating means and the output of the waveform shaping means; and a means for converting the output signal of the phase comparing means to a DC voltage signal and also for supplying the DC voltage signal to the voltage-controlled oscillating means, whereby the PLL circuit can operate in response to the carrier components of all the input signals, a rapid remedy is possible for phase jitter through the circuit, and a distortion in the picture signal can be eliminated to produce clear pictures.

This invention especially concerns an improvement in a facsimile receiver belonging to the group 2 disclosed in the recommendation T series by the International Telegraph and Telephone Consulative Committee (hereinafter referred to briefly as CCITT).

In a general facsimile transmission, a transmitting station reads documents by scanning, modulates the picture signal obtained by scanning and sends the modulated signal to a receiving station, and a receiving station demodulates the received signal and reproduces the original picture on a copying medium by scanning.

The recommendation T-3 by CCITT has for the demodulation in a facsimile receiver belonging to the group 2 the following regulation.

Equivalent modulated waveforms with vestigial sideband amplitude modulation—phase modulation characteristics should be used for Group 2 apparatus operated on leased circuits and on the general switched telephone network. The carrier frequency should be $2100\pm 10$ Hz. A white signal should be represented by maximum carrier and a black signal by minimum (at least 26 dB below white) or no carrier. The phase of the carrier representing white may be reversed after each transition through black.

However, though a facsimile transmitter which meets the above regulation can be provided relatively easily, some difficulties must be overcome to provide a facsimile receiver well matched to the transmitter.

First, in the case of demodulation by synchronous detection in a facsimile receiver, the reproduction of the carrier in the carrier reproduction section was sometimes very difficult since some parts of the picture signal lack the carrier completely or since frequencies different from the carrier frequency often appear in the picture area where black and white alternate minutely or repetitively. On the contrary, when the frequency and phase of the reproduced carrier are fixed during a period of the picture signal, the reproduced carrier cannot follow up the picture signal when phase jitter was generated due to the influence from the telephone circuitry, so that the reproduced picture has a poor quality.

Secondly, the carrier reproducing section usually uses a phase-locked loop circuit (hereinafter referred to briefly as a PLL circuit). The PLL circuit reproduces a signal in phase with the carrier by using a tonal signal or a phasing signal having the same frequency as the carrier to be received before the arrival of picture signal so that the synchronous detection is performed on the incoming picture signal. In the communication according to the above group 2, there exist intervals where no carrier is present (i.e. black signal interval) and therefore the PLL circuit must stop reproducing the carrier during those intervals and hold the state just before the interval. For this purpose, the PLL circuit has a voltage holding circuit in which there is used a capacitor having a large capacitance. However, when the facsimile receiver is turned on, an abnormal voltage is developed across the capacitor. Since the capacitor has a large capacitance, the PLL circuit must be operated for a long time before the capacitor is charged to a desired voltage. Thus, unless the capacitor has been charged to the desired voltage before the picture signal arrived, it was impossible to reproduce a normal carrier and therefore to perform a regular synchronous detection.

Finally, since according to the group 2 communication the facsimile transmitter sends a white signal as the maximum carrier and a black signal as the minimum carrier or as a signal without carrier, as described above, the recording section of the facsimile receiver must receive the black-white inverted version of the input signal obtained by demodulating the transmitted signal. However, the voltage level of the demodulated signal tends to be affected by the preset voltage level in the AGC circuit or by the demodulating circuit and therefore cannot be uniquely determined. Thus, it was very difficult to settle the voltage level for black-white insersion. Namely, it often happened that a black record was made for a white signal and that some portions of intermediate tone signal was ignored.

It is therefore one object of this invention is to provide an improved facsimile receiver.

Another object of this invention is to provide a facsimile receiver belonging to the group 2 of the series T according to the recommendation by CCITT.

Yet another object of this invention is to provide a facsimile receiver equipped with an improved carrier reproducing apparatus which can operate in response to the carriers of all the received signals and reproduce signals in phase with the carriers.

A further object of this invention is to provide an improved facsimile receiver which can reproduce a signal in phase with the carrier before the reception of picture signal.

The facsimile receiver according to this invention performs a reception operation on the signal sent from a transmitting station in accordance with a predetermined procedure. The predetermined procedure refers to the preparatory procedure for starting communication, effected by plural communication control signals (i.e., tonal signals) exchanged between the transmitting and the receiving stations. This procedure is also described in the CCITT recommendation.

Further, the transmitted signal is formed by modulating the source signal obtained through the scanning of documents at the transmitting station so that the modulated signal may have the same modulation waveform as the VSB-AM-PM characteristic, by representing a white signal as the maximum carrier and a black signal as the minimum carrier or a signal without carrier, and by inverting the phase of the white signal each time the black-to-white signal change occurs. And the received signal is demodulated by synchronous detection. The demodulated signal becomes the original source signal through the full-wave rectification of its phase-inverted portions and since the black and the white signals are inverted, the demodulated source signal is sent to the recording apparatus after it has been subjected to the black-white inversion. According to this invention, the level of the voltage for the black-white inversion is controlled as variable in accordance with the gain of the demodulated signal. As a result, a copy similar to the document at the transmitting station can be obtained at the receiving station.

The facsimile receiver described above incorporates therein a carrier reproducing apparatus with a PLL circuit for performing synchronous detection. The carrier reproducing apparatus extracts only the carrier from the received signal by means of a band-pass filter etc. The extracted carrier is subjected to waveform shaping. The PLL circuit is operated in response to the shaped signal so that a signal in phase with the carrier is reproduced.

Moreover, the facsimile receiver has a function of resetting the voltage holding circuit in the PLL circuit across which an abnormal voltage is developed when the power switch is turned on. Namely, the voltage holding circuit is reset by supplying also to the PLL circuit the communication control signals having the same frequency as the carrier generated by the facsimile receiver.

Figure 2:
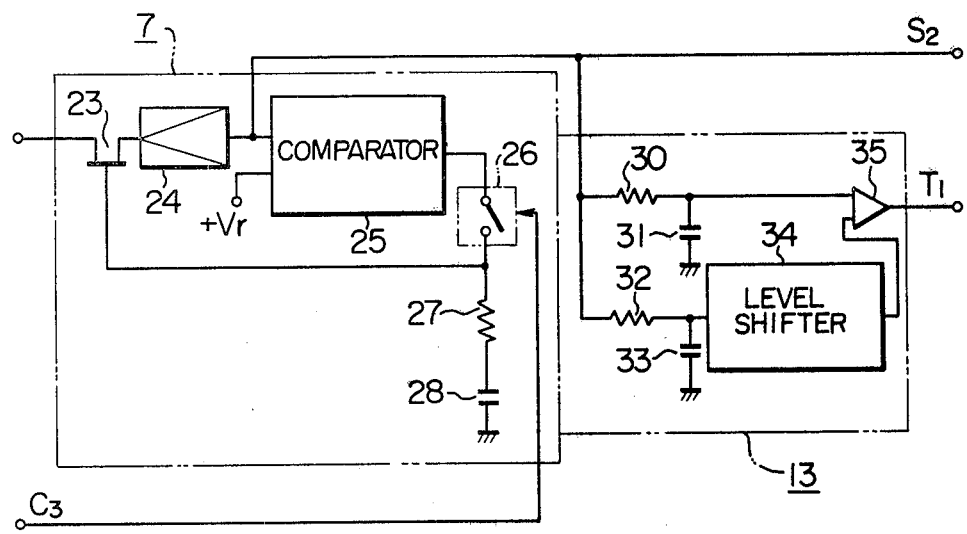
Figure 4:
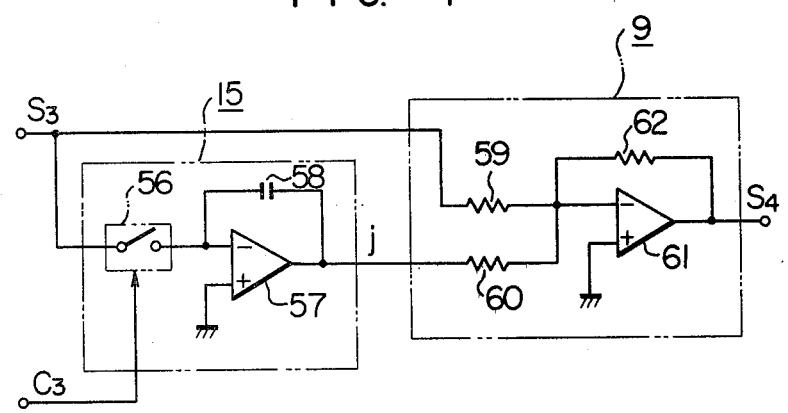
Figure 3:
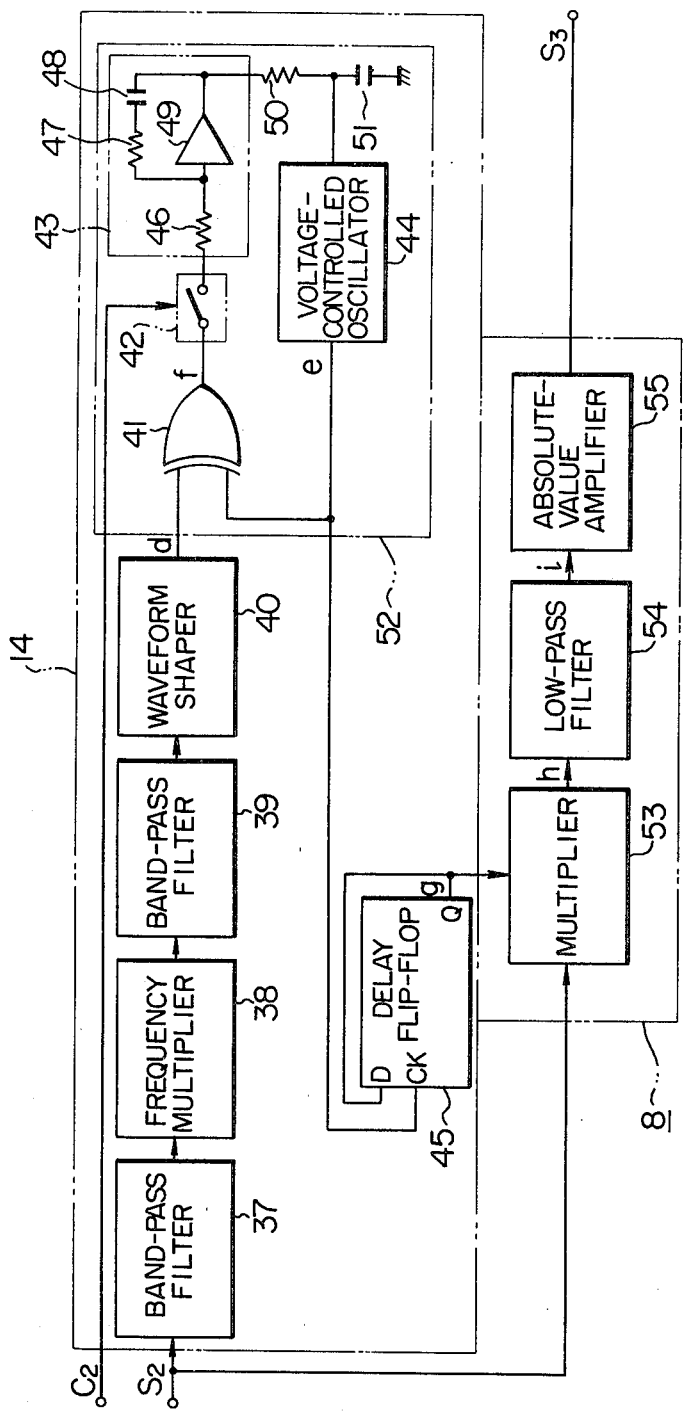
Figure 5:
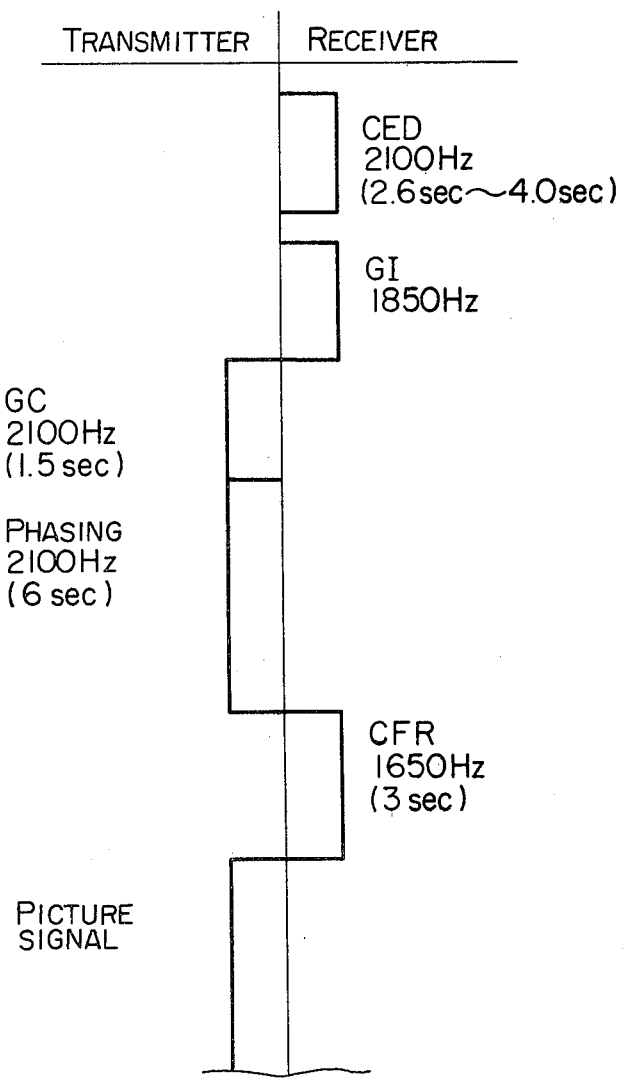
Figure 6:
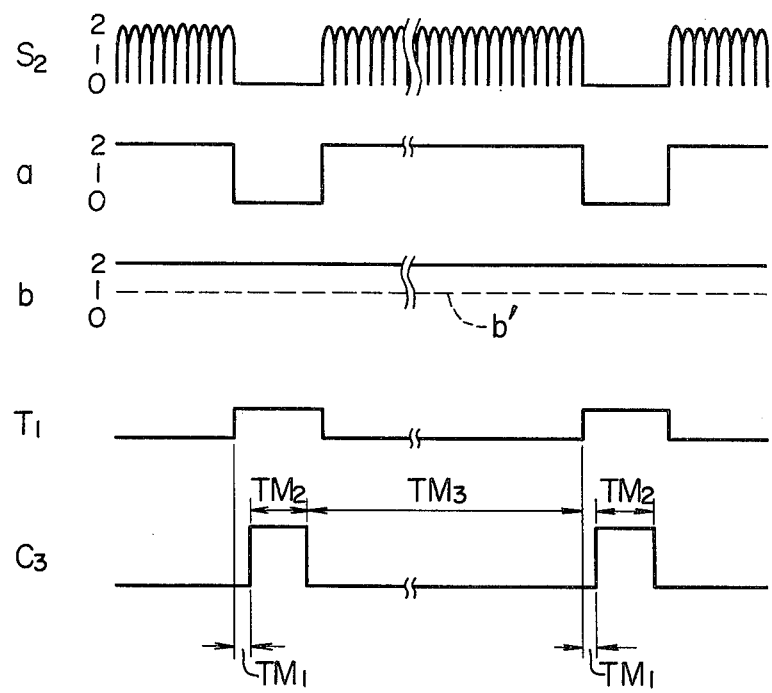
Figure 8:
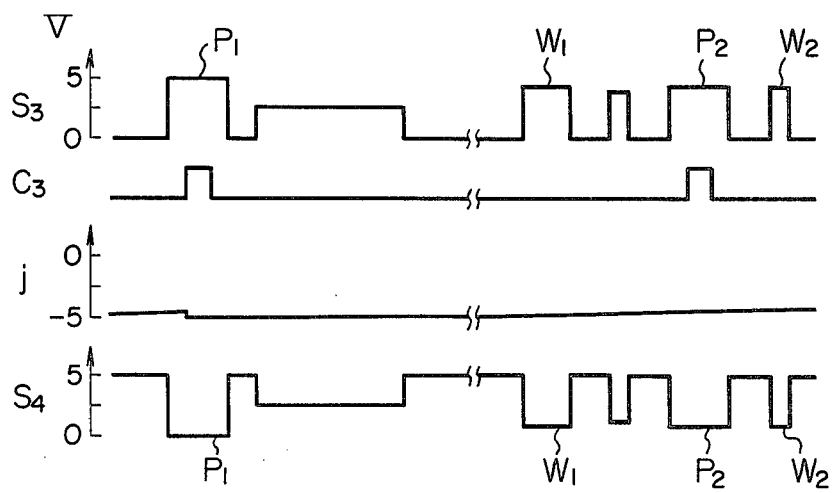
Figure 7:
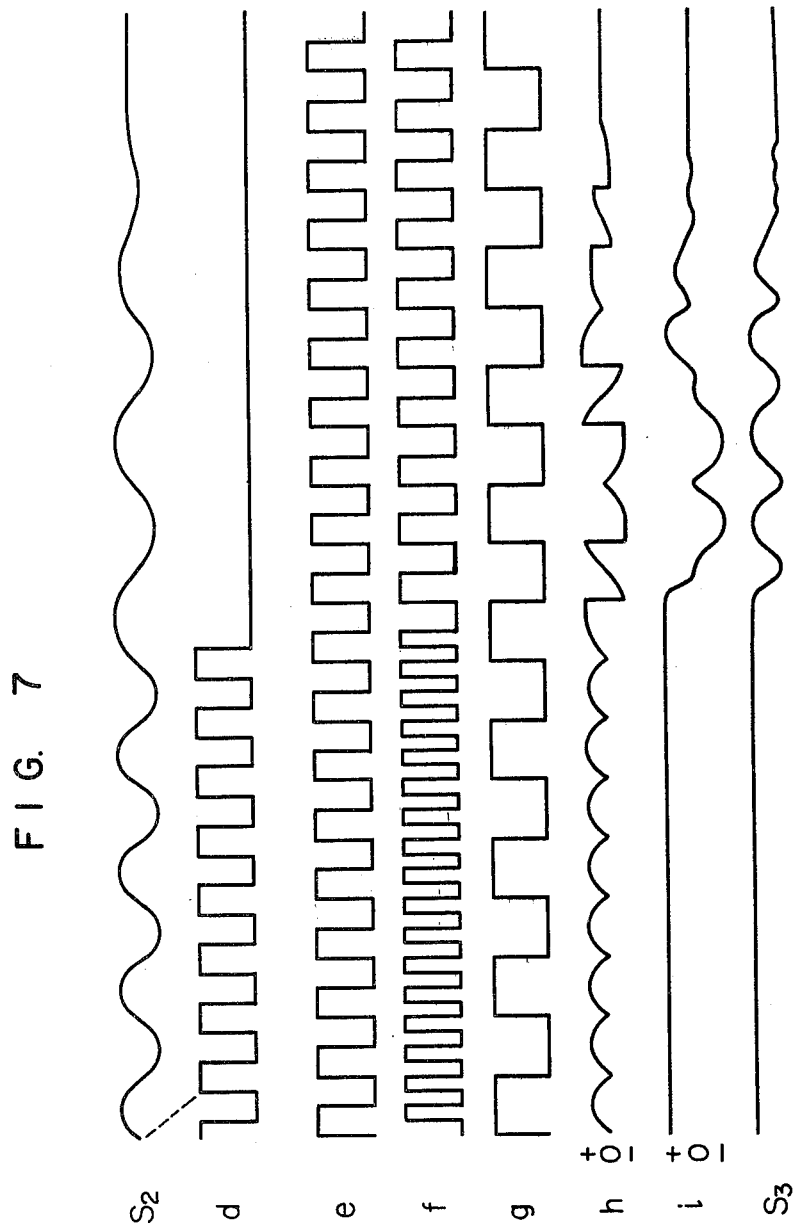

Other objects, features and advantages of this invention will be apparent from the following detailed description of the preferred embodiment of this invention taken in conjunction with the attached drawings, in which:

FIG. 1 schematically shows in block diagram a facsimile receiver as an embodiment of this invention;

FIG. 2 schematically shows the AGC circuit and the phase signal reproducing circuit used in the facsimile receiver shown in FIG. 1;

FIG. 3 schematically shows the carrier reproducing apparatus and the demodulating circuit used in the facsimile receiver shown in FIG. 1;

FIG. 4 schematically shows the sample hold circuit and the black-white inverting circuit used in the facsimile receiver shown in FIG. 1;

FIG. 5 illustrates the communication signals according to the recommendation by CCITT; and FIGS. 6, 7 and 8 show the waveforms useful in explaining the operations of the circuits shown in FIGS. 2, 3 and 4 respectively.

FIG. 1 schematically shows in block diagram a facsimile receiver as an embodiment of this invention. Reference numeral 2 designates a control circuit. The control circuit 2 may be replaced by a microcomputer such as those which have been recently developed. The control circuit 2 serves to control the mehanical parts and the electronic circuits. For the simplification of description the constitution of the control circuit 2 will not be explained, but only the cause-and-effect relationship between input and output will be detailed, with the control circuit 2 itself shown as a black box.

Numeral 3 designates a relay-switch for selectively connecting a telephone circuit 21 with a telephone set 20 or a facsimile receiver 1. When a reception button switch 19 is turned on, a connection is made between the facsimile receiver 1 and the telephone circuit 21 to start a facsimile communication. Numeral 4 designates a hybrid circuit for separating signals to be transmitted from received signals. Namely, the hybrid circuit 4 serves to deliver the signal supplied from a modulating circuit 17, to the telephone circuit 21 and to deliver the signal received through the circuit 21, to an equalizing circuit 5. The equalizing circuit 5 is so provided as to cancel various influences which the transmitted signal experienced during the propagation through the telephone circuit 21. The equalizing circuit 5 comprises an amplitude equalizer, a group delay equalizer etc. Numeral 6 indicates a switch for changing over between the output of the modulating circuit 17 and the output of the equalizing circuit 5 in response to the control signal from a control circuit 2. A variable gain control apparatus 7 serves to compensate for the change in, for example, the gain of the telephone circuit. The apparatus 7 controls the gain by utilizing the reference signal corresponding to the maximum reflectivity associated with the signal having the greatest amplitude (i.e., white signal in this invention) of all the signals transmitted after the scanning of the original document from the transmitting station (this reference signal is hereinafter referred to also as phase signal). A phase signal reproducing circuit 13 reproduces the phase signal defined above in the form of a pulse signal. The electric circuit of the variable gain control apparatus 7 and the phase signal reproducing circuit 13 are shown in FIG. 2.

A demodulating circuit 8 detects the output of the variable gain control apparatus 7 in synchronism with the signal reproduced by a carrier reproducing circuit 14 and rectifies the synchronously detected output in a full-wave fashion to reproduce the original source signal. The carrier reproducing circuit 14 and the demodulating circuit 8 are shown in FIG. 3.

A sample hold circuit 15 serves to sample only the central portion of the phase signal among the signals delivered from the demodulating circuit 8 and to hold the voltage of the sampled signal. A black-white inverting circuit 9 serves to invert the output of the demodulating circuit 8 on the basis of the output of the sample hold circuit as a reference signal. The sample hold circuit 15 and the black-white inverting circuit 9 are shown in FIG. 4.

A recording apparatus 10, permitting various modes of operation, may be of any type that can perform recording by using synchronizing information, picture element information and start/stop information.

A waveform shaping circuit 11 converts the input signal thereto into a signal having a rectangular waveform. A frequency detecting circuit 12 detects the frequency of the output of the waveform shaping circuit 11 by measuring the interval between the adjacent rising edges of the output through the counting of clock pulses having a very high repetition frequency by a counter.

A transmitting signal control circuit 18 controls the frequency of the communication control signal delivered from the modulating circuit 17. The output of the modulating circuit 17 is amplified by an amplifier 16. Numeral 22 denotes a switch for supplying power to the facsimile receiver 1.

The operation of the facsimile receiver having such a constitution as described above will be described in the following. With this constitution, the facsimile communication starts by turning on the power switch 22 and pushing the reception button switch 19 after an ordinary speech circuit has been established.

In this case, when the power switch 22 is turned on, an abnormal voltage is generated in the voltage holding circuit 43 of the carrier reproducing apparatus 14 shown in FIG. 3. For example, assuming that the source voltage for the operational amplifier 49 of the voltage holding circuit 43 is $\pm 12$ V. Then, a voltage within a range of $+12$ V to $-12$ V is developed across the capacitor 48 at random. If a voltage of $+12$ V is developed across the capacitor 48, the voltage holding circuit 43, maintaining this voltage, delivers an output so that a voltage-controlled oscillator 44 delivers a signal having a frequency quite different from the rated frequency (4200 Hz). The rated frequency of the voltage-controlled oscillator 44 is so selected at 4200 Hz as to meet the required condition. Namely, the frequency 4200 Hz is frequency-divided to a half the original frequency, i.e. 2100 Hz, which is the same as that of the carrier and which is supplied to the demodulating circuit 8 for synchronous detection. Since the capacitor 48 of the voltage holding circuit 43 has a large capacitance, the voltage developed across the capacitor 48 is not so rapidly lowered to a desired level (e.g. $\pm 0$ V).

Then, by pushing the reception starting switch, the control circuit 2 delivers a control signal $C_1$. In response to the control signal $C_1$, the change-over switch 3 selects the facsimile receiver 1 through the telephone set 20 was connected with the telephone circuit 21 before the reception of the control signal $C_1$ by the switch 3. At the same time, the communication signals are exchanged between transmitting and receiving stations according to the procedure stated in the recommendation by CCITT. The sending order and the frequencies of the communication signals are illustrated in FIG. 5. In the conventional facsimile system, it was customary for the carrier reproducing apparatus to be preadjusted on the GC signal and the phasing signal sent from the transmitting station and to reproduce a signal in phase with the carrier before the arrival of picture signal. However, when an abnormal voltage is held by the voltage holding circuit 43, as described above, a further operation will sometimes be necessary.

According to this invention, therefore, before the CED signal is sent out, the switch 6 is changed over by a control signal $C_5$ to cause the selecting contact 100 to select the selectable contact 101. As a result of this, the CED signal is delivered through the modulating circuit 17 and the hybrid circuit 4 to the telephone circuit 21 and also supplied to the demodulating side. Simultaneously, since the PLL circuit 52 of the carrier reproducing apparatus 14 is operated, the carrier reproducing apparatus 14 is preadjusted to render the voltage in the voltage holding circuit 43 from an abnormal value to a desired value. When the apparatus 14 is thereafter preadjusted on the GC signal and the phasing signal, the signal having the same phase as that of the carrier can be easily reproduced.

If in this case the rated frequency of the voltage-controlled oscillator 44 is variable, the GI signal succeeding to the CED signal can also be used as a signal for the preadjustment of the carrier reproducing apparatus. Namely, it is only necessary to control the rated frequency of the voltage-controlled oscillator 44 to be 3700 Hz when the GI signal is received by the carrier reproducing apparatus and then to restore the rated frequency to its initial value 4200 Hz after the transmission of the GI signal. Thus, by using also the GI signal as a preadjustment signal, an abnormal voltage developed in the voltage holding circuit can be rendered to a desired value.

Upon completion of the transmission of the CFR signal, the exchange of the communication control signals is completed. Then, the transmitting station starts sending a picture signal. The picture signal is sent through the telephone circuit 21 and received by the facsimile receiver 1. The hybrid circuit 4 causes the picture signal to be supplied to the receiving side. Concerning the switch 6, since the control signal $C_5$ from the control circuit 2 vanishes when the CED signal or the GI signal vanishes, the selecting terminal 100 now selects the terminal to be selected or selectable terminal 102.

The picture signal is further supplied through the circuit equalizer 5 to the variable gain control apparatus 7. The variable gain control circuit 7 is shown in FIG. 2. In FIG. 2, a transistor 23 functions as a variable resistance element and is controlled by an integrating circuit consisting of a resistor 27 and a capacitor 28 and having a large time constant. The output of a constant gain amplifier 24 is supplied not only to a comparator 25 but also to the phase signal reproducing circuit 13, the carrier reproducing circuit 14 and the demodulating circuit 8. The comparator 25 compares the input signal thereto with the reference voltage $+Vr$ and delivers an output voltage level corresponding to the difference between the input signal and the reference voltage. A switch 26 is closed each time the central portion of the phase signal arrives so that the capacitor 28 is charged with the output voltage level from the comparator 25. Accordingly, the transistor 23 is controlled by the output voltage level of the comparator 25. And this voltage level is held until the next phase signal has arrived. In this way, the gain of the signal input to the facsimile receiver is automatically controlled so that the gain of the input signal may be maintained constant. Since the transmitting station sends out the phase signal having a constant gain, the phase signal is suitable as a reference for gain control.

A control signal $C_3$ for the switch 26 is generated by the control circuit 2 on the basis of a phase pulse signal $T_1$ formed in the phase signal reproducing circuit 13.

The phase signal reproducing circuit 13 plays its part only during the period in which the phasing signal exists. The phasing signal consists of a regular alternate series of black signals and white signals, the proportion of the black to the white signals being 5:95 or 5% to 95%. In the phase signal reproducing circuit 13 shown in FIG. 2, a resistor 30 and a capacitor 31 constitute an integrating circuit having a small time constant while a resistor 32 and a capacitor 33 make up an integrating circuit having a large time constant. Numeral 34 indicates a level shifter for reducing the voltage level of the input to a half the level and numeral 35 designates a comparator for delivering an inverted output.

The operation of the circuit 13 will be explained with the aid of the waveforms shown in FIG. 6. An input signal $S_2$ is transformed through the integrating circuit having the smaller time constant into a signal a and also through the integrating circuit having the larger time constant into a signal b. The signal b is passed through the level shifter 34 to be a signal b'. The signal $T_1$ is obtained by comparing the signal a with the signal b' and by inverting the result of the comparison. The signal $T_1$ is delivered, as a synchronizing signal, from the control circuit 2 to the recording apparatus 10 so that the recording apparatus 10 operates in synchronism with the reading apparatus in the transmitting station. Also, the control circuit 2 produces a control signal $C_3$ on the basis of the signal $T_1$. Namely, the control circuit 2 detects the leading edge of the signal $T_1$ and causes the counter provided therein to perform a counting operation during a first predetermined period TM1 of time. When the counter finishes the counting during the period TM1, the control signal $C_3$ is caused to rise and simultaneously the counter is caused to perform a counting operation during a second predetermined period TM2 of time. When the counter finishes the counting during the period TM2, the control signal $C_3$ is caused to fall and simultaneously the counter is caused to perform a counting operation during a third predetermined period TM3 of time. Upon completion of the counting during the third period TM3 of time, the above counting series are repeated as shown with the waveform $C_3$ in FIG. 6. In this way, the control circuit can produce the control signal $C_3$ for controlling the switch 26 and therefore can control the switch 26. This operation lasts as long as a length of communication continues.

The picture signal with its gain controlled to a constant level in the variable gain control circuit 7, is supplied to the demodulating circuit 8 and is demodulated by the circuit 8 through synchronous detection. To effect a synchronous detection, it is necessary to reproduce a signal in phase with the carrier of the picture signal. For this purpose, there is provided the carrier reproducing circuit 14 which reproduces a carrier by receiving the output of the variable gain control apparatus 7. As described above, some portions of this picture signal may often lack the carrier. In the conventional facsimile communication system, therefore, it is the carrier reproducing apparatus that, operating like the above described variable gain control apparatus 7, reproduces a carrier at the arrival of the phase signal (always accompanying the carrier) contained in the picture signal and that holds the phase of the reproduced carrier until the next phase signal arrives. With this conventional carrier reproducing apparatus, however, if phase jitter occurs in the picture signal, the reproduced lines become quite different from the corresponding parts of the original picture so that a considerable degradation of the reproduced picture is incurred.

According to this invention, there is provided a facsimile receiver furnished with a carrier reproducing circuit capable of compensating the phase jitter generated in the picture signal by reproducing a signal having a constant phase with respect to all the carrier components in the picture signal.

FIG. 3 shows in block diagram the details of the carrier reproducing circuit 14 and the demodulating circuit 8 shown in FIG. 1. In the carrier reproducing circuit 14, reference numeral 37 denotes a band-pass filter having a center frequency of 2100 Hz, 38 a frequency multiplier having a frequency multiplication factor of 2, and 39 a band-pass filter having a center frequency of 4200 Hz. With these circuit components, only the normal carrier components of the picture signal are extracted. The thus extracted components are converted to a signal having a rectangular waveform by a waveform shaping circuit 40 and the signal with the rectangular waveform is then supplied to a PLL circuit 52.

In the PLL circuit 52, an Exclusive OR circuit 41 serves as a phase comparator. A switch 42 turns on and off the PLL circuit 52 in response to the control signal $C_2$ from the control circuit 2. An integrating circuit 43 comprises resistors 46 and 47, a capacitor 48 and an operational amplifier 49. A resistor 50 and a capacitor 51 constitute a low-pass filter. The VCO (voltage-controlled oscillator) 44 has its oscillation frequency varied in accordance with the level of the input voltage. The feature of the thus constructed PLL circuit 52 is that it assumes a coincidence in phase between the output signals of the waveform shaping circuit 40 and the VCO 44 when they are out of phase by 90° from each other. Namely, the duty ratio of the output signal of the phase comparator 41 (i.e., the ratio of the duration of high level to the duration of low level in the output signal) becomes 1:1 in both the case where the picture signal contains the normal carrier and it is out of phase by 90° from the output signal of the VCO 44 and the case where there is no normal carrier contained in the picture signal. The output of the phase comparator 41 is sent through the integrating circuit and the low-pass filter and then serves as a DC voltage level signal. This DC voltage level signal is supplied to the VCO 44 to control the oscillation frequency of the VCO 44.

FIG. 7 shows waveforms appearing at various points in the carrier reproducing circuit and the demodulating circuit shown in FIG. 3. In FIG. 7, a signal $S_2$ is to be supplied to the carrier reproducing circuit and shows the change ranging from the normal carrier to the disappearance of the normal carrier. As seen from FIG. 7, even when the signal $S_2$ contains no carrier of 2100 Hz, the phase comparator 41 delivers a signal having a duty ratio of 1:1, which is the same ratio as in the case of the phase difference being 90°, so that the oscillation frequency of the VCO 44 is maintained invariable.

If phase jitter is generated in this case, the duty ratio of the output signal of the phase comparator 41 deviates from the value 1:1. Accordingly, the DC voltage level signal obtained through the integrating circuit and the low-pass filter takes a value corresponding to a duty ratio other than 1:1. As a result, the oscillation frequency of the VCO 44, which was shifted in this case and different from a desired value, is to be corrected to the desired value by the DC voltage level signal. In this way, the PLL circuit 52 can cause the VCO 44 to deliver an output signal e out of phase by 90° from a signal d when the carrier of 2100 Hz is present in the signal $S_2$, and also cause the VCO 44 to continue to deliver the signal having the same phase as before when the carrier of 2100 Hz disappears from the signal $S_2$. The switch 42 is actuated by the control signal $C_3$ delivered from the control circuit 2 at the transmission of the CED signal or at the reception of the GC signal, the phasing signal or the picture signal, so that the switch 42 controls the operation of the PLL circuit 52.

The frequency of the output signal of the VCO 44 is halved by a delay flip-flop 45 so that it is reduced to 2100 Hz. The output g of the delay flip-flop 45 having a frequency of 2100 Hz is sent to the demodulating circuit 8.

As described above, according to the carrier reproducing circuit embodying this invention, the PLL circuit 52 operates in response to all the normal carriers having a frequency of 2100 Hz contained in the received picture signal and therefore a rapid remedy for phase jitter etc. mixed into the picture signal can be devised so that the distortion in reproduced pictures can be limited to the minimum degree possible. Moreover, with this carrier reproducing circuit, since no complicated external control is needed, the overall constitution is simplified.

Next, in the demodulating circuit 8 shown in FIG. 3, reference numeral 53 designates a multiplier, 54 a low-pass filter, and 55 an absolute-value amplifier. The multiplier 53 performs a synchronous detection by the use of the received picture signal $S_2$ and the reproduced carrier signal g. The output signal of the multiplier 53 is shown as a waveform h in FIG. 7. The low-pass filter 54 serves to eliminate higher harmonic components. The output of the low-pass filter 54 is shown as a waveform i in FIG. 7. The absolute-value amplifier 55 is so provided as to fold up the negative portion of the output h of the multiplier 53, which is a three-level analog signal, to the positive region. The output of the absolute-value amplifier 55 is shown as a signal $S_3$ in FIG. 7. The output signal $S_3$, which is also the output of the demodulating signal 8, represents the level of the white signal since as described before the white signal is represented as the maximum carrier in the picture signal. However, in general records, black records are made in the white background. Accordingly, it is necessary also in this case to subject the output signal $S_3$ of the demodulating circuit 8 to the black-white inversion before it is supplied to the recording apparatus 10.

In the case where the circuit is under abnormal condition, the level of the voltage set in the AGC circuit and the demodulating circuit are adversely affected by the unfavorable condition so that the voltage level of the output signal $S_3$ of the demodulating signal 8 is shifted. With the conventional facsimile system, since the reference voltage level for the black-white inversion is fixed to a value, the following drawbacks are incurred. Namely, in the reproduced picture, a white record i.e. non-record, is sometimes erroneously replaced by a black record, i.e. actual record, some of half-tone records are erroneously ignored, or the contrast of the whole record is not uniform.

In the facsimile receiver according to this invention, the output signal $S_3$ of the demodulating circuit 8 is supplied to both the black-white inverting circuit 9 and the sample hold circuit 15. The sample hold circuit 15 holds the maximum voltage level of the signal $S_3$ and a suitable black-white inversion is effected by using the maximum voltage level of the signal $S_3$ held in the sample hold circuit 15, as the reference voltage level for the black-white inversion.

FIG. 4 shows the sample hold circuit 15 and the black-white inverting circuit 9. In the sample hold circuit 15, a switch 56, serving as a sampling switch, is controlled by keyed-pulse signal $C_3$. An operational amplifier 57 and a capacitor 58 constitute a holding circuit. In the black-white inverting circuit 9, reference numerals 59, 60 and 62 designate resistors and 61 an operational amplifier. Now, the operations of the sample hold circuit 15 and the black-white inverting circuit 9 will be described with the aid of FIG. 8 which shows waveforms useful in explaining these operations.

First, the output signal $S_3$ of the demodulating circuit 8 is bifurcated to be applied respectively to the sample hold circuit and to the black-white inverting circuit 9. The signal $S_3$ directed to the sample hold circuit 15 is supplied to the switch 56, which is turned on and off by the control signal $C_3$ produced by the control circuit 2. As described before, since the control signal $C_3$ assumes a high level only at the central portion of the phase signal, the switch 56 is turned on in response only to the central portions of the phase signals $P_1$ and $P_2$ contained in the picture signal $S_3$. Thus, the switch 56 operates to perform sampling in accordance with the control signal $C_3$. The central portions of the phase signals $P_1$ and $P_2$ takes the highest level of all the levels in the picture signal and therefore are equal to the level of the white signal W. Accordingly, the switch 56 delivers an output as the highest, white level each time the phase signal arrives. The output of the switch 56 is also bifurcated to be supplied to the input terminal "−" of the operational amplifier 57 and the output terminal of the operational amplifier 57 through the capacitor 58. The input terminal "+" of the operational amplifier 57 is grounded. Consequently, the output signal j of the operational amplifier 57 appears as an inverted version of the voltage level at the central portion of the phase signal $P_1$ or $P_2$. The voltage level of the signal j is held by the capacitor 58. For example, if the highest level of the phase signal $P_1$ in the picture signal $S_3$ shown in FIG. 8, is equal to +5 V, then the signal j has a level of −5 V. The signal j is supplied to the black-white inverting circuit 9 and used therein as the reference voltage for the black-white inversion of the signal $S_3$. Namely, in the black-white inverting circuit 9, the signal j is supplied through the resistor 60 to the input terminal "−" of the operational amplifier 61 while the same input terminal "−" of the amplifier 61 receives also the signal $S_3$ through the resistor 59. Further, the input terminal "−" of the operational amplifier 61 is connected through the resistor 62 with the output terminal thereof and the input terminal "+" of the operational amplifier 61 is grounded. The resistors 59, 60 and 61 have in this case the same resistance value. With this black-white inverting circuit 9, the output $S_4$ of the circuit 9 appears as what would be obtained by inverting the signal $S_3$ without amplification and by shifting the lowest level to 0V, as shown in FIG. 8.

Even if the level of the signals $S_4$ is lowered accidentally as seen in the phase signal $P_2$ in FIG. 8, owing to adverse effects from the AGC and the demodulating circuits, no trouble is incurred. Namely, since the black-white inversion is carried out again on the basis of the reference signal sampled at the central portion of the phase signal $P_2$ in the signal $S_3$, those levels of the signal $S_4$ which correspond to the highest levels of the signal S₃ are always set to OV and the other levels are also inverted with their reference level set at OV.

The output signal S₄ of the black-white inverting circuit 9 is supplied to the recording apparatus 10 which may be of any suitable type. The recording apparatus 10 converts the signal S₄ to a recording signal for providing print on recording paper. As described above, the white levels W₁ and W₂ in the signal S₄ are always at OV and since the recording apparatus 10 uses the level of OV as the reference for the formation of the recording signal, such errors as black print for a white signal or dropouts of half-tone signals can be prevented. The start/stop operation of the recording apparatus 10 is instructed by the control signal C₄ from the control circuit 2.

As described above, according to the black-white inverting circuit 9 embodying this invention, the voltage level of the central portion of the phase signal contained in the demodulated signal is sampled and held, and the held voltage level is used as the reference for the black-white inversion so that optimal printing signals are obtained, resulting in the elimination of erroneous phenomena such as the replacement of a white signal by a black one and the dropouts of half-tone signals.

Thus, according to this invention, there is provided an improved facsimile receiver which belongs to the group 2 defined by the recommendation by CCITT. It should be noted that this invention can be applied also to a facsimile system of a type other than that defined in the CCITT's recommendation. Moreover, the embodiments hitherto described should not be considered to impose any restriction upon this invention, but numerous variations within the spirit and scope of this invention can be easily thought of by those skilled in the art.

What is claimed is:

1. A facsimile receiver for demodulating a received image signal through synchronous detection comprising:
   demodulation means for synchronously detecting an image signal received from a transmitting facsimile station;
   carrier reproducing means for reproducing a carrier signal from a received image signal and providing said reproduced carrier signal to said demodulation means, said carrier reproducing means including a phase locked loop circuit having an input for receiving a carrier signal contained in said image signal;
   means for transmitting a communication control signal to said transmitting facsimile station prior to the reception of an image signal from said facsimile station;
   means for selectively applying said communications control signal to the input of said phase locked loop circuit to cause said phase locked loop circuit to operate in response to said communications control signal; and,
   a control circuit for providing a control signal which activates said means for selectively applying to cause said communications control signal to be applied to the input of said phase locked loop.

2. A facsimile receiver as claimed in claim 1, wherein said carrier reproducing means comprises a means for extracting the carrier from a received image signal; means for shaping the waveform of said extracted carrier; voltage-controlled oscillator means; means for comparing the phase of the output of said voltage-controlled oscillator means with that of the output of said waveform shaping means through an Exclusive OR logic; means for converting the output of said phase comparator means to a DC voltage level signal and also for supplying said DC voltage level signal to said voltage-controlled oscillator means; and, means coupled to the output of said voltage-controlled oscillator for providing said reproduced carrier signal.

* * * * *